United States Patent
Arora et al.

(10) Patent No.: US 12,008,023 B2
(45) Date of Patent: *Jun. 11, 2024

(54) METHOD AND SYSTEM FOR GROUPING OF BLOCKCHAIN NODES

(71) Applicant: MASTERCARD INTERNATIONAL INCORPORATED, Purchase, NY (US)

(72) Inventors: Ankur Arora, New Delhi (IN); Jaipal Singh Kumawat, Rajasthan (IN); Blessy Vohra, Uttar Pradesh (IN); Ved Pratap Singh Chauhan, Uttar Pradesh (IN); Shubham Jain, Chhattisgarh (IN); Shreya Mittal, Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 17/749,415

(22) Filed: May 20, 2022

(65) Prior Publication Data

US 2022/0277027 A1    Sep. 1, 2022

Related U.S. Application Data

(63) Continuation-in-part of application No. 16/884,495, filed on May 27, 2020, now Pat. No. 11,341,161.

(51) Int. Cl.
  *G06F 16/28*  (2019.01)
  *G06F 16/23*  (2019.01)
(52) U.S. Cl.
  CPC ........ *G06F 16/285* (2019.01); *G06F 16/2379* (2019.01)

(58) Field of Classification Search
  CPC .............. G06F 16/285; G06F 16/2379; G06Q 20/3678; G06Q 20/065; H04L 9/50; H04L 63/126
  (Continued)

(56) References Cited

U.S. PATENT DOCUMENTS

2020/0186510 A1   6/2020   Kursun
2020/0186523 A1*  6/2020   Kursun ............... H04L 63/0876
(Continued)

OTHER PUBLICATIONS

Chaudhry, et al., "Consensus Algorithms in Blockchain: Comparative Analysis, Challenges and Opportunities", 12th International Conference on Open Source Systems and Technologies (ICOSST), 2018 (month unknown), pp. 54-63.

*Primary Examiner* — Michael Pham
(74) *Attorney, Agent, or Firm* — Panitch Schwarze Belisario & Nadel LLP

(57) ABSTRACT

A method for improving consensus in a blockchain network through decentralized grouping includes: identifying, by each node of a plurality of nodes in a blockchain network that manages a blockchain, a plurality of groups, where each is comprised of a subset of nodes; generating, by each node in each subset of nodes, a new block for the blockchain; performing, by each subset of nodes, a first consensus operation among all nodes in the subset of nodes for the new block generated by in the subset of nodes to identify a group consensus block, where each node in the subset of nodes receives the group's group consensus block; and performing, by the blockchain network, a second consensus operation among all groups for the identified group consensus block to identify an overall consensus block, where a majority of groups of the plurality of groups receives the overall consensus block.

28 Claims, 7 Drawing Sheets

(58) Field of Classification Search
USPC .......................................................... 707/690
See application file for complete search history.

(56) References Cited

U.S. PATENT DOCUMENTS

2020/0250747 A1 8/2020 Padmanabhan
2020/0344070 A1 10/2020 Li

* cited by examiner

METHOD AND SYSTEM FOR GROUPING OF BLOCKCHAIN NODES

FIELD

The present disclosure relates to improving consensus in a blockchain network through decentralized grouping, specifically the automatic separation of blockchain nodes into groups where consensus is shared among all nodes in each group, resulting in greater overall consensus and less forking.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. New blocks are added to the blockchain through a process known as "consensus." In a traditional consensus process, blockchain nodes work to generate a new block that satisfies all requirements, a process known as "mining," and then will share the new block with other nodes. The other nodes will confirm that the block is suitable and then distribute the block throughout the blockchain, which effectively adds that block into the blockchain and moves the nodes on to working on consensus on the next block.

However, there are instances where two blockchain nodes may independently come up with the new block. If the new block is the same (e.g., both nodes independently generated the same solution), then there are no conflicts and the consensus may occur across the blockchain even faster. If the new blocks are different (e.g., include different transactions, different nonces, different timestamps, etc.), then consensus may proceed separately for each block. The result is that the blockchain may become "forked," where some nodes will proceed with a different block than other nodes. In such cases, the main blockchain is the blockchain where a majority of nodes reached consensus with a new block, where a fork is any separate version of the blockchain where consensus was reached with a different block.

In most instances, a fork of a blockchain will eventually stop as the number of nodes decreases and new transactions are unable to be added as they may reference transactions not found in the fork. In such cases, the nodes that follow a fork may synchronize back with the main chain, discarding the blocks added in the fork after leaving the main chain and adding in any blocks added to the main chain during that same time. However, as a fork is created, the number of nodes following the main blockchain decreases. Following the creation of a fork, new forks may be created, further limiting the number of blockchain nodes following the main chain. This may continue before any nodes rejoin the main chain, which can drastically reduce the number of blockchain nodes in the main blockchain, which can leave the blockchain susceptible to 51% attacks. Thus, there is a need for a solution to improve consensus in a blockchain.

SUMMARY

The present disclosure provides a description of systems and methods for improving consensus in a blockchain network through decentralized grouping. In the blockchain network, blockchain nodes are able to independently generate groups of nodes. Consensus is first performed by each group, where the blockchain nodes in the group reach a consensus on a new block. In groups, no fork can be created; instead, when the consensus is reached every node in the group supports that same new block. Consensus is then performed in the blockchain through the groups in place of individual nodes, with each group pushing their new block. The result is that more nodes will be a part of the higher consensus than in traditional blockchains, resulting in less forking and higher retention of nodes in the main blockchain. Thus, utilizing the two consensus processes during the consensus of a new block and using groups of nodes for the first consensus process, more blockchain nodes will continue to follow a main blockchain.

A method for improving consensus in a blockchain network through decentralized grouping includes: identifying, by each node of a plurality of nodes in a blockchain network that manages a blockchain, a plurality of groups, where each group in the plurality of groups is comprised of a subset of nodes of the plurality of nodes; generating, by each node in the subset of nodes comprising each group of the plurality of groups, a new block for the blockchain, where the new block includes at least a block header and a plurality of blockchain data values; performing, by the subset of nodes comprising each group of the plurality of groups, a first consensus operation among all nodes in the subset of nodes for the new block generated by each node in the subset of nodes to identify a group consensus block, where each node in the subset of nodes for each group of the plurality of groups receives the group consensus block; and performing, by the blockchain network, a second consensus operation among all groups in the plurality of groups for the group consensus block identified in the first consensus operation for each group of the plurality of groups to identify an overall consensus block, where a majority of groups of the plurality of groups receives the overall consensus block.

A system for improving consensus in a blockchain network through decentralized grouping includes: a blockchain network that manages a blockchain; and a plurality of nodes in the blockchain network, wherein each node of the plurality of nodes identifies a plurality of groups, where each group in the plurality of groups is comprised of a subset of nodes of the plurality of nodes, each node in the subset of nodes comprising each group of the plurality of groups generates a new block for the blockchain, where the new block includes at least a block header and a plurality of blockchain data values, the subset of nodes comprising each group of the plurality of groups performs a first consensus operation among all nodes in the subset of nodes for the new block generated by each node in the subset of nodes to identify a group consensus block, where each node in the subset of nodes for each group of the plurality of groups receives the group consensus block, and the blockchain network performs a second consensus operation among all groups in the plurality of groups for the group consensus block identified in the first consensus operation for each group of the plurality of groups to identify an overall consensus block, where a majority of groups of the plurality of groups receives the overall consensus block.

A method for parallel generation and confirmation of new blocks in a blockchain through decentralized grouping includes: identifying, by each node of a plurality of nodes in a blockchain network that manages a blockchain, a plurality of node groups, where each node group in the plurality of node groups is comprised of a subset of nodes of the plurality of nodes; identifying, by the blockchain network, a plurality of transaction groups, wherein each transaction group of the plurality of transaction groups includes one or more pending blockchain transactions; assigning, by the blockchain network, a transaction group of the plurality of transaction groups to each node group of the plurality of node groups; performing, by the subset of nodes comprising each node group of the plurality of node groups, a consensus operation among all nodes in the subset of nodes to generate a new block unique to the respective node group of the plurality of node groups and transmit the generated new block to other node groups in the plurality of node groups; and confirming, by each node group of the plurality of node groups, the new block generated by each node group of the plurality of node groups.

A system for parallel generation and confirmation of new blocks in a blockchain through decentralized grouping includes: a blockchain network that manages a blockchain; and a plurality of nodes in the blockchain network, wherein each node of the plurality of nodes identifies a plurality of node groups, where each node group in the plurality of node groups is comprised of a subset of nodes of the plurality of nodes; the blockchain network identifies a plurality of transaction groups, wherein each transaction group of the plurality of transaction groups includes one or more pending blockchain transactions; the blockchain network assigns a transaction group of the plurality of transaction groups to each node group of the plurality of node groups; the subset of nodes comprising each node group of the plurality of node groups performs a consensus operation among all nodes in the subset of nodes to generate a new block unique to the respective node group of the plurality of node groups and transmit the generated new block to other node groups in the plurality of node groups; and each node group of the plurality of node groups confirms the new block generated by each node group of the plurality of node groups.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Improved Consensus in a Blockchain Network

Figure 1:
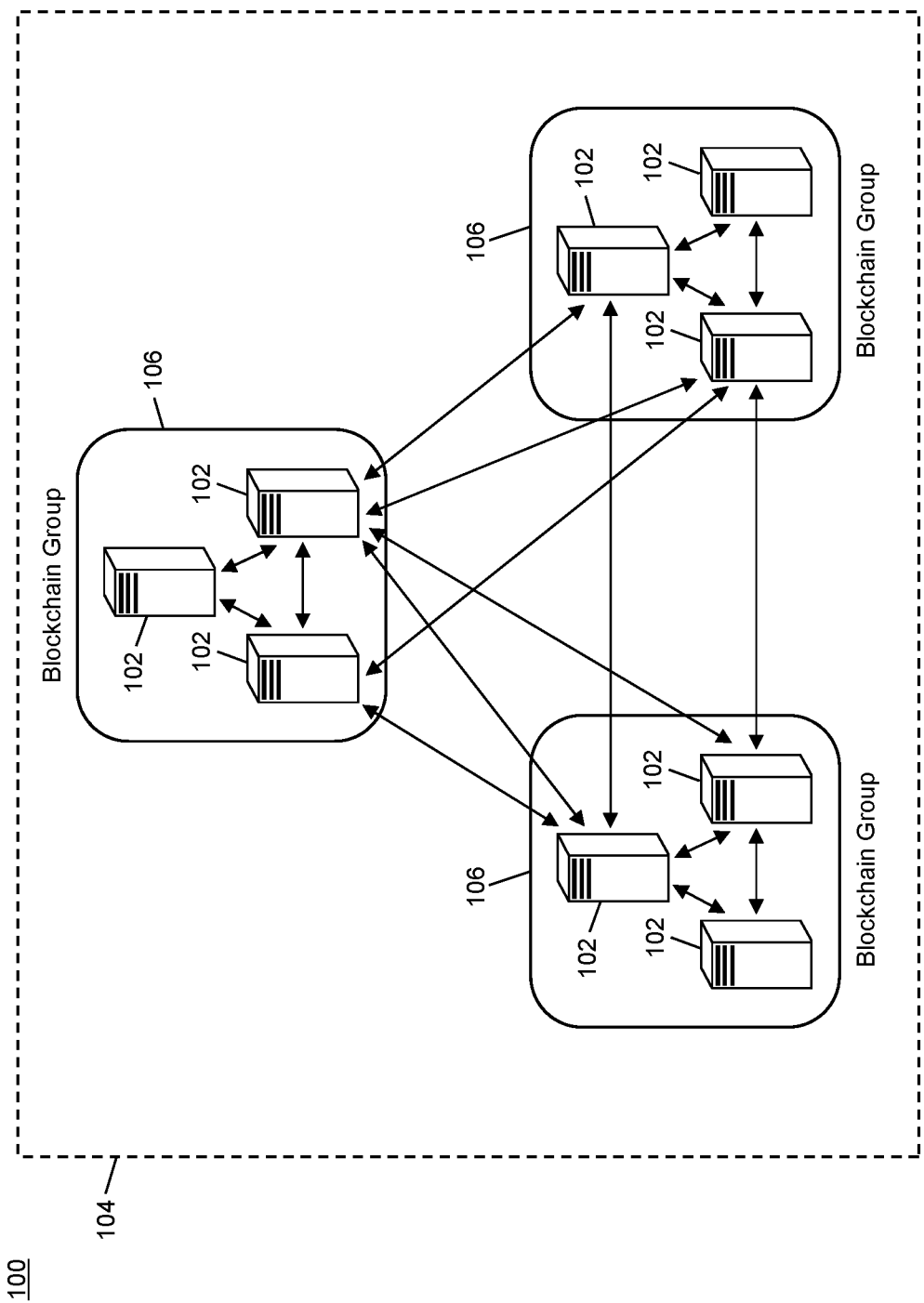
FIG. 1 is a block diagram illustrating a high level system architecture for improving consensus in a blockchain network through grouping in accordance with exemplary embodiments.

FIG. 1 illustrates a system 100 for improving consensus in a blockchain network through the use of groups of blockchain nodes and multiple consensus operations during consensus of a new block.

Figure 2:
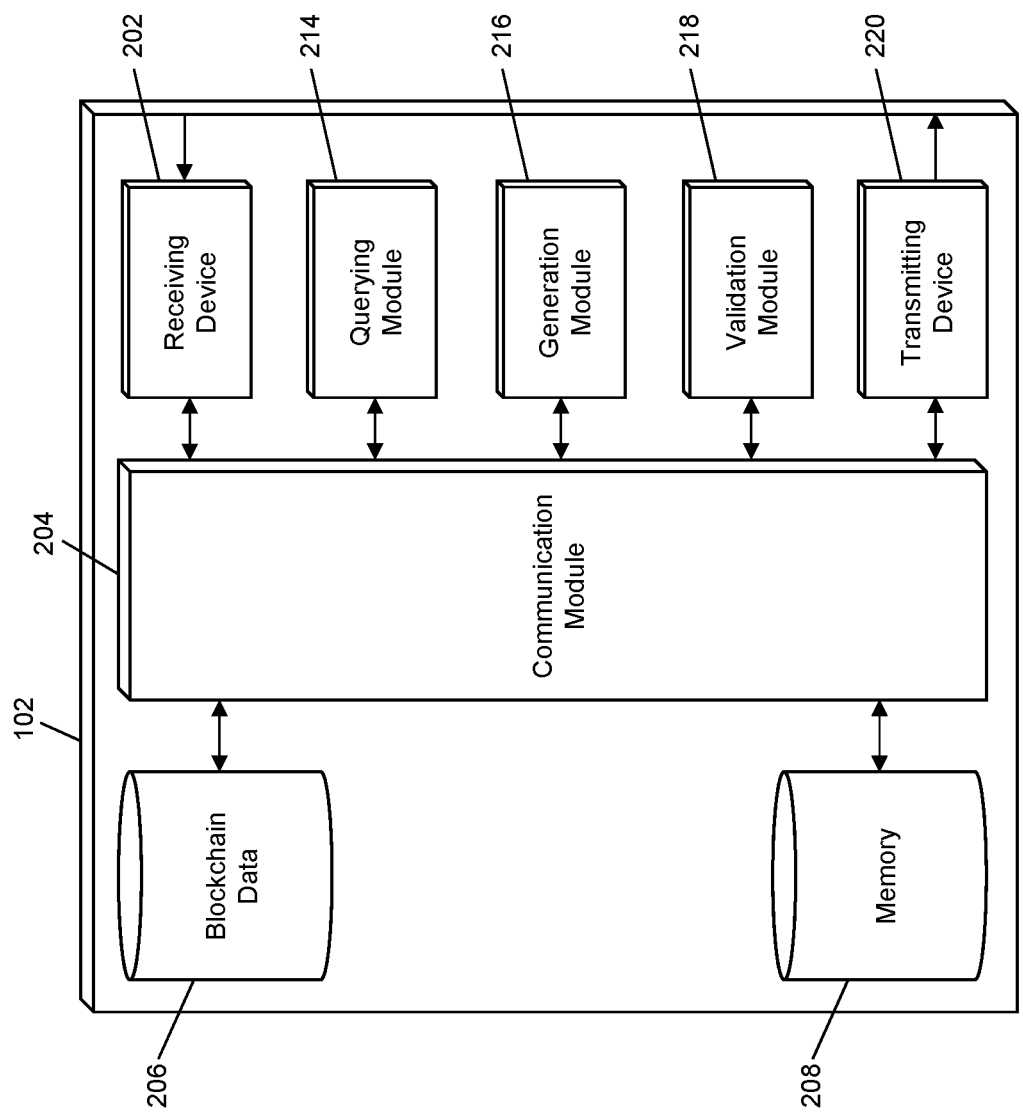
FIG. 2 is a block diagram illustrating a blockchain node of the system of FIG. 1 for improving consensus through grouping in a blockchain network in accordance with exemplary embodiments.
Figure 5:
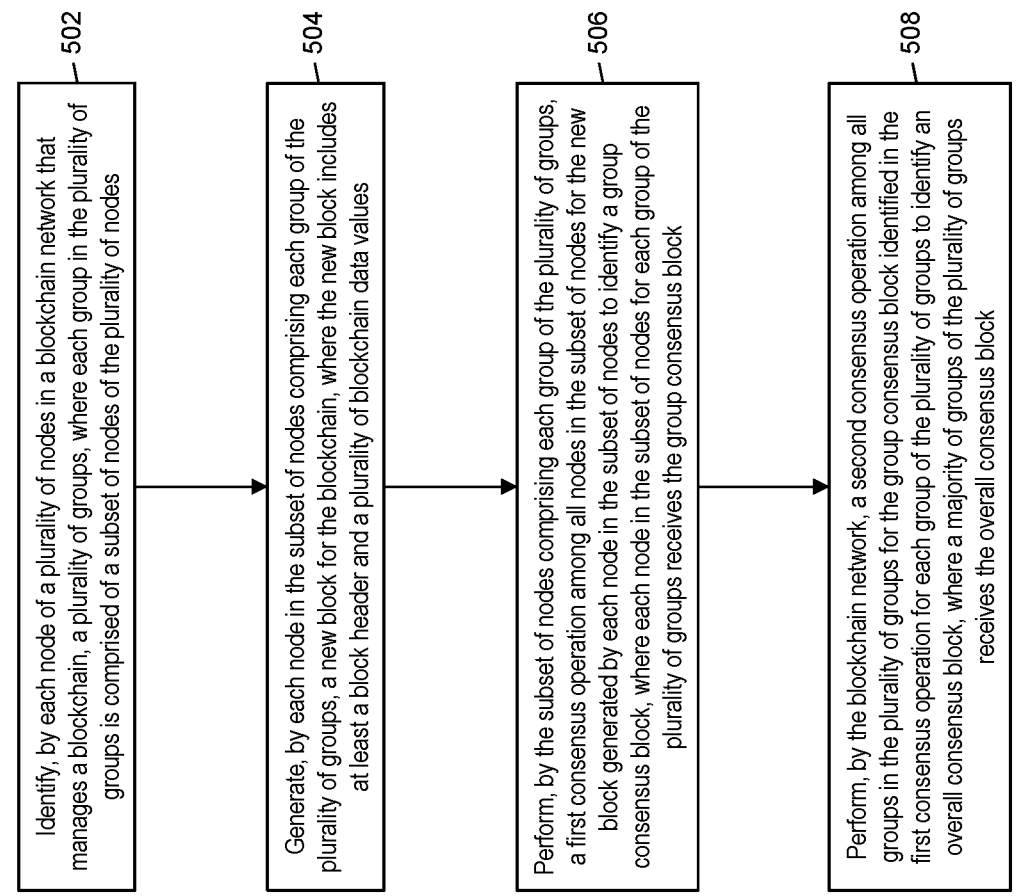
FIG. 5 is a flow chart illustrating an exemplary method for improving consensus in a blockchain network through decentralized grouping in accordance with exemplary embodiments.

The system 100 may include a blockchain network 104. The blockchain network 104 may be comprised of a plurality of blockchain nodes 102. Each blockchain node 102 may be a computing system, such as illustrated in FIGS. 2 and 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. For the traditional processing of a blockchain transaction, such data may be provided to a blockchain node 102 in the blockchain network 104, either by the sender or the recipient. The node may verify the digital signature using the public key in the cryptographic key pair of the sender's wallet and also verify the sender's access to the funds, a process known as "confirmation" of a transaction, and then include the blockchain transaction in a new block. The new block may be validated by other nodes in the blockchain network 104 before being added to the blockchain and distributed to all of the blockchain nodes 102 in the blockchain network 104 in traditional blockchain implementations during consensus. In cases where a blockchain data value may not be related to a blockchain transaction, but instead the storage of other types of data, blockchain data values may still include or otherwise involve the validation of a digital signature.

In a traditional blockchain, each blockchain node 102 may attempt to generate a new block that can be confirmed for the blockchain. A block may have to satisfy one or more requirements depending on the configuration of the blockchain itself. For instance, the block reference value must be accurate and validated by independent generation thereof by another blockchain node 102 and the data reference value must also be accurate and independent verifiable by another blockchain node 102. In some blockchains, a new block must include a nonce in the block header thereof where, when the new block or the new block header is hashed, the resulting hash value satisfies predetermined criteria, such as a value having a predetermined number of leading zeroes. In such cases, blockchain nodes 102 may randomly select nonces and generate hash values until a suitable value is found, after which they may use the nonce and generate the new block and submit the new block to other blockchain nodes 102.

A blockchain node 102 may continue to attempt to generate a suitable new block until a new block is generated or until a new block is received from another blockchain node 102 in the blockchain network 104. In latter instances, the blockchain node 102 may confirm that the new block, $Block_A$, is suitable (e.g., it follows all applicable rules) and, if so, distribute the new block to other blockchain nodes 102 connected thereto in the blockchain network 104. Through such a process, as soon as a new block can be generated by a blockchain node 102, the new block is distributed throughout the blockchain network 104. However, in some cases, a different blockchain node 102 may independently generate a new block, $Block_B$, that is different from $Block_A$. For instance, the other blockchain node 102 may identify a different nonce that still results in a hash value having a suitable number of leading zeroes. In such cases, the blocks may be confirmed and distributed throughout the blockchain network 104. Whichever block is distributed to a majority of blockchain nodes 102 in the blockchain network 104 dictates the main blockchain, where a blockchain for blockchain nodes 102 that confirmed the other block becomes a fork from the main blockchain.

In the system 100, the blockchain nodes 102 may be configured to separate into groups of nodes that share consensus decisions, which may result in higher retention of blockchain nodes 102 in the main blockchain and reduce forking, thereby having a blockchain of greater strength that is less susceptible to 51% attacks or other forms of fraud. The blockchain nodes 102 in the blockchain network 104 may be configured to identify a plurality of blockchain groups 106, where each blockchain group 106 includes a subset of the blockchain nodes 102 in the blockchain network 104. In some cases, each blockchain group 106 may be required to have the same number of blockchain nodes 102. In some instances, the number of blockchain nodes 102 in a blockchain group 106 may not be exactly equal, but may be as close to the same number as possible (e.g., all groups of five with two groups of four due to an uneven number of blockchain nodes 102).

In some embodiments, the blockchain itself may be configured with an executable script or other data that can be used by each blockchain node 102 to independently identify the blockchain groups 106. For example, a configuration file or operating rules that each blockchain node 102 has and follows to operate as a blockchain node 102 may include a script or other rules that are used to identify the blockchain groups 106. For instance, the script may order every blockchain node 102 in the blockchain network 104 by device identifier and then separate the blockchain nodes 102 into blockchain groups 106 using a random number generated that operates using a time-based salt such that each blockchain node 102 that executes the script will identify the same blockchain groups 106. In some instances, the blockchain itself may include a smart contract that may self-execute to identify the blockchain groups 106, such as using the same process discussed above. The operation may enable each blockchain node 102 to independently identify the blockchain groups 106 or, at least, the blockchain group 106 to which the blockchain node 102 itself belongs. Such an operation prevents any centralized system from being able to separate the blockchain nodes 102 in any particular manner, preventing potential attacks and fraud, and maintains the ability of the blockchain to be decentralized and lack oversight by any specific entity or system.

The blockchain nodes 102 in the blockchain network 104 may attempt to generate a suitable new block in the same manner as in a traditional blockchain. Once a blockchain node 102 generates a new block that is suitable, it may distribute the new block to only blockchain nodes 102 in its same blockchain group 106. A first consensus operation may be performed among the blockchain nodes 102 in that particular blockchain group 106. In cases where the blockchain node 102 comes up with the solution prior to any other blockchain node 102 in the blockchain group 106, the entire blockchain group 106 may reach consensus on the same block. If multiple blockchain nodes 102 in the blockchain group 106 independently generate different solutions, then consensus may be reached using the same process as in a traditional blockchain. However, unlike in a traditional blockchain, when a majority of blockchain nodes 102 in a blockchain group 106 confirm a specific block, that specific block becomes the new block for each blockchain node 102 in the blockchain group 106. Any blockchain nodes 102 that confirmed a different block will discard the different block and confirm the specific block, resulting in each blockchain node 102 in the blockchain group 106 following the same blockchain. In some embodiments, the blockchain groups 106 may be of a suitable size such that only one block may be in the process of confirmation at any time, which may further prevent the possibility of forks.

When a blockchain group 106 confirms a new block during the first consensus process, the new block may be distributed to other, connected blockchain groups 106 in the blockchain network 104. A blockchain group 106 that receives the new block from another blockchain group 106 may attempt to confirm that new block. In effect, each blockchain group 106 may perform a second consensus operation that is similar to the consensus operation performed among blockchain nodes 102 in a traditional blockchain. For instance, if the blockchain group 106 has not yet confirmed a new block, a blockchain node 102 in the blockchain group 106 may attempt to confirm the new block and, if successful, may distribute the new block to every blockchain node 102 in its group, resulting in that blockchain group 106 adopting the consensus of the first blockchain group 106. The blockchain group 106 may then (e.g., via each blockchain node 102 included therein) distribute the confirmed block to other blockchain groups 106 as part of the second consensus operation.

The new block may then be added to the blockchain accordingly. In some cases, a different blockchain group 106 may independently generate a different and come to a group consensus on a different new block, $Block_B$. In such cases, the different blockchain group 106 may submit the new block to other blockchain groups 106 for confirmation, where the block that is confirmed by a majority of the blockchain groups 106 will be added to what becomes the main blockchain, while blockchain groups 106 that confirm $Block_B$ become a fork.

The use of blockchain groups 106 where each blockchain node 102 therein follows consensus of the group may improve the strength of a consensus in the blockchain network 104, thus reducing forking and the blockchain nodes 102 that follow a fork off of a blockchain. For instance, in an example, the blockchain network 104 may include 1,000 blockchain nodes 102. In a traditional blockchain, 850 of the blockchain nodes 102 may reach consensus on $Block_A$, while the other 150 blockchain nodes 102 may reach consensus on $Block_B$, resulting in a fork where the main blockchain loses 15% of its member nodes. Conversely, the system 100 may separate the 1,000 blockchain nodes 102 into twenty groups of 50 blockchain nodes 102. If the 15% of member nodes are evenly distributed in the groups, each blockchain group 106 will reach consensus on $Block_A$, resulting in 100% consensus overall as each blockchain node 102 in a blockchain group 106 follows the consensus result of that group. In a worst case scenario, where 150 blockchain nodes 102 that would confirm $Block_B$ are included in blockchain groups 106 to force consensus in that blockchain group 106 to $Block_B$, fifteen of the twenty groups would still have consensus on $Block_A$, having 75% of the blockchain nodes 102 still following the main blockchain. Accordingly, in most distributions of blockchain nodes 102, the consensus may be improved through grouping.

In some embodiments, the script or other data used in the identification of blockchain groups 106 may utilize past confirmation history of blockchain nodes 102 in the grouping thereof. For instance, the blockchain or another data storage mechanism, such as a sidechain or alternative blockchain, may store a record of the confirmation of each blockchain node 102, such as recording if a blockchain node 102 confirms the new block in the main blockchain or confirms a different block (e.g., even if the blockchain node 102 adopted the new block in the main blockchain as a result of its blockchain group 106). In such embodiments, the script may generate blockchain groups 106 where blockchain nodes 102 that have recently or have had a history of confirming a different block may be evenly distributed in the blockchain groups 106. Such a distribution may prevent attempted attacks on the blockchain network 104. For example, if a nefarious party began controlling large numbers of blockchain nodes 102 to attempt a 51% attack, repeated attempts at confirming a block that does not have a majority consensus will result in those blockchain nodes 102 being controlled being separated among the blockchain groups 106, vastly reducing the effectiveness of such an attempt and making the attack even more difficult. Thus, the use of groups as discussed herein and independent identification thereof provided for greater defense against such attacks in a blockchain network 104.

In some embodiments, the script may use a clustering algorithm to generate the blockchain groups 106 from clusters of blockchain nodes 102 formed based on the past confirmation history of blockchain nodes 102. For example, if there are fifty blockchain nodes 102, and thirty may agree on a first solution block, and the other twenty may agree on a second solution block, then the thirty nodes 102 that agree on the first solution block may be clustered together in a first cluster, and the twenty nodes 102 that agree on the second solution block may be clustered together in a second cluster.

This clustering process may repeat again and again, and over time, the nodes 102 may be clustered with other nodes 102 that have a similar confirmation history. In this way, nefarious nodes 102 may be clustered closer together in large cluster(s) and may be more easily identified, which may be due to these nodes 102 may be making the same decisions on each transaction and block. In this same way, good or non-nefarious nodes 102 may be separated from the nefarious nodes and may be in sparse or smaller clusters. In some cases, the blockchain groups 106 may then be formed from the clusters. For example, the nefarious nodes 102 may be diluted with other non-nefarious nodes 102 in forming the blockchain groups 106, such that the nefarious nodes 102 may be outnumbered by other non-nefarious nodes 102 in each group, thus avoiding attacks on the blockchain. In some cases, implementing clustering may result in a unanimous consensus from all nodes 102. Blocks formed and confirmed in this manner may be labeled unanimous blocks. Any type of clustering algorithm may be used to form the clusters. For example, the script may implement a Louvain Clustering algorithm (such as described at https://neo4j.com/docs/graph-algorithms/current/algorithms/louvain/, which is incorporated by reference herein in its entirety) or an Ego-Splitting algorithm (such as described in "Ego-Splitting Framework: from Non-Overlapping to Overlapping Clusters," which is incorporated by reference herein in its entirety) to cluster the nodes 102 based on their past confirmation history.

In some embodiments, the script may form blockchain groups 106 with a certain percentage or number of nodes 102 being common to all of the blockchain groups 106. In some cases, the sampling, selection, or identification of these common nodes 102 may be based on the past confirmation history of those common blockchain nodes 102. These common nodes 102 may reach a super consensus on a solution or new block, and these common nodes 102 may push this solution or new block their respective blockchain groups 106, thus having each blockchain group 106 adopt the solution or new block from the super consensus of the common blockchain nodes 102. In some embodiments, the common nodes 102 may form a majority of nodes 102 in each group 106, which may result in a faster consensus determination. In some cases, implementing this super consensus aspect may result in a unanimous consensus from all nodes 102. Blocks formed and confirmed in this manner may be labeled unanimous blocks.

In some embodiments, the script may form blockchain groups 106, where each group 106 may have a leader node 102, which may broadcast a solution, transaction, or new block to other follower nodes 102 in the respective blockchain group 106. After the follower nodes 102 receive the solution, transaction, or new block from the leader node 102, the follower nodes 102 adopt that solution or new block. In this way, the respective group 106 may reach a consensus on the leader node 102's solution or block quicker. Any solution or other block that the follower nodes 102 may have adopted may be discarded in favor of the solution or new block of the leader node 102. For example, if there are 100 active nodes 102 that are split evenly into 20 groups 106 of 5 nodes 102 each, there may be only 20 leader nodes 102 (one in each group 106) needed to build a consensus for the blockchain of 100 active nodes 102. In some cases, the script may be implemented to randomly select a leader node 102 and designate the other nodes in the group 106 as follower nodes 102. In some cases, the selection or identification of the leader node 102 may be based on the past confirmation history of blockchain nodes 102 in the group 106. For example, a node 102 with a positive or non-nefarious confirmation history may have more of a chance of being selected as a leader node 102 than a more nefarious node 102. In some embodiments, if a particular leader node 102's solutions are not reaching the right consensus of the other leader nodes 102, the follower nodes 102 in that particular leader nodes 102's group 106 may initiate a change leader request. This may be done periodically by sampling the leader nodes 102 (or other follower nodes 102) to determine which of those nodes 102 have helped in reaching the correct consensus solution. This may ensure that the leader node 102 and the follower nodes 102 are arranged such that a unanimous consensus is reached in the blockchain. Blocks formed and confirmed in this manner may be labeled unanimous blocks.

Any other suitable mechanism or criteria may be used to separate the blockchain nodes 102 into the plurality of blockchain groups 106. In one example, the blockchain network 104 may monitor the performance of blockchain nodes 102 and use such performance in the identification of the blockchain groups 106. For instance, each blockchain node 102 may be assigned a propensity value, which may represent the propensity for that blockchain node 102 to diverge from the majority of blockchain nodes 102 in the blockchain network 104 (e.g., generate or confirm $Block_B$ rather than Blocky that is used in the main chain). Such propensity values may be updated each time a new block is confirmed and added to the blockchain or at another predetermined interval, such as every predetermined number of blocks, every day, etc. When blockchain groups 106 are identified, the blockchain network 104 may (e.g., using methods discussed above) separate the blockchain nodes 102 into blockchain groups 106 in a manner that minimizes the number of blockchain nodes 102 whose propensity value is above a predetermined threshold in each blockchain group 106. In other words, blockchain nodes 102 that are determined to have a high propensity of diverging from the blockchain (e.g., based on the propensity value being above a predetermined threshold value) may be spread out across the blockchain groups 106 to minimize the number of divergent blockchain nodes 102 in a single blockchain group 106. Such a method may significantly increase the difficulty for a nefarious entity to force forking or the confirmation of a fraudulent block.

In another example, blockchain groups 106 may be identified based on power consumption, processing power, or other such metric of the blockchain nodes 102 included in the blockchain group 106. For instance, the blockchain groups 106 may be identified such that the combined processing power of the blockchain nodes 102 that comprise each blockchain group 106 is equal, which may occur when each blockchain group 106 has an equal number of blockchain nodes 102 therein or may occur with the number of blockchain nodes 102 in a blockchain group 106 varying from one group to another. In some such instances, each blockchain group 106 may distribute or assign nonces to be used by each blockchain node 102 in the blockchain group 106 in the generation of a new block for use in the first consensus process. In such an instance, nonces may be distributed based on the processing power (e.g., or other such metric) of each blockchain node 102 in the blockchain group 106. For example, a list of nonces may be randomly generated and split up into groups where each group is assigned to one of the blockchain nodes 102 for use in attempting the generation of a new block. In cases where processing power may vary among the blockchain nodes 102 in a blockchain group 106, the nonces may be split into groups of varying sizes that correspond to the ratios of processing power between the blockchain nodes 102. For instance, a blockchain node 102 that can test 100 nonces in the time it takes other blockchain nodes 102 to test 50 nonces may be given a group of nonces that is twice the size as the other blockchain nodes 102 in the blockchain group 106. Such a distribution of nonces may provide for more efficient generation of new blocks by a blockchain group 106. In such cases, any reward, processing fees, etc. provided for the successful generation of a new block may be split among the blockchain nodes 102 in the blockchain group 106 that generated the new block first, to encourage the distribution of nonces in each blockchain group 106.

In some embodiments, the system 100 may be configured to use blockchain groups 106 to enable parallel processing of new blocks for the blockchain in the blockchain network 104. In such embodiments, the blockchain nodes 102 may be separated into a plurality of blockchain groups 106, as discussed above. Pending transactions that have been submitted to the blockchain network 104 (e.g., via the blockchain nodes 102 thereof) may be separated into transaction groups and each transaction group assigned to a blockchain group 106. Transaction groups may be identified by one or more of the blockchain nodes 102 themselves, such as using the same methods discussed above with respective to blockchain groups 106, or other suitable method, such as via a smart contract. For example, all pending transactions that have been received since the most recent block was added to the blockchain may be ordered based on a timestamp thereof and the pending transactions separated into groups of each number of transactions accordingly. In an exemplary embodiment, the pending transactions may be grouped such that every pending transaction that involves the same sender (e.g., where the blockchain currency being transferred was controlled by the same blockchain wallet) is included in a single transaction group. Such a grouping may prevent the double spend of blockchain currency associated with a blockchain wallet.

Once the groups of pending blockchain transactions have been identified, each transaction group may be assigned to one of the blockchain groups 106 such that each blockchain group 106 receives a group of one or more pending blockchain transactions. Each blockchain group 106 may then perform a consensus operation to generate a new block and perform consensus thereon for a new block that includes all of the pending blockchain transactions (e.g., if successfully verified) assigned to the blockchain group 106. In some instances, a blockchain group 106 may be divided into a plurality of subgroups and a two-step consensus process discussed above performed to generate the new block for that blockchain group 106.

After a blockchain group 106 generates a new block that includes its assigned blockchain transactions, the blockchain group 106 may distribute the new block to the other blockchain groups 106 in the blockchain network 104. The other blockchain groups 106 may receive the new block and may verify and confirm the new block using traditional processes. Each blockchain group 106 may generate their own new block and confirm the blocks generated by the other blockchain groups 106, which may result in a number of new blocks generated for the blockchain that is equal to the number of blockchain groups 106. All of these new blocks may thus be added to the blockchain. Such a method is referred to herein as parallel processing or parallel generation and confirmation of new blocks. By processing new blocks in parallel using groups of blockchain nodes 102, where each new block includes less pending blockchain transactions to confirm and hash, the parallel blocks can be generated and confirmed faster than a traditional single block and done so using less processing power, and thus less resources in general, of the blockchain nodes 102 in the blockchain network 104. The result is a faster, more efficient process for adding new blockchain transactions to a blockchain using the blockchain groups 106.

The methods and systems discussed herein provide for decentralized grouping of blockchain nodes 102 in a blockchain network 104 into blockchain groups 106. A traditional consensus process is separated into two consensus operations, which are performed first within a blockchain group 106 and then across the blockchain groups 106 themselves, where each blockchain node 102 in a blockchain group 106 accepts the new block for which the blockchain group 106 reached a consensus. The result is often a stronger consensus, which leads to higher retention of blockchain nodes 102 in a main chain, further strengthening the blockchain network 104 against attacks.

Blockchain Node

FIG. 2 illustrates an embodiment of the blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 500 illustrated in FIG. 5 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102 and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 102 that may be superimposed or otherwise encoded with new transactions for confirmation, confirmed blockchain transactions, new blocks for confirmation, confirmed blocks for addition to the blockchain, messages regarding block confirmations, etc.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 102 may also include a memory 208. The memory 208 may be configured to store data for use by the blockchain node 102 in performing the functions discussed herein, such as public and private keys, symmetric keys, etc. The memory 208 may be configured to store data using suitable data formatting methods and schema and may be any suitable type of memory, such as read-only memory, random access memory, etc. The memory 208 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 208 may be comprised of or may otherwise include a relational database that utilizes structured query language for the storage, identification, modifying, updating, accessing, etc. of structured data sets stored therein. The memory 208 may be configured to store, for example, cryptographic keys, salts, nonces, communication information for blockchain nodes 102 and blockchain networks 104, address generation and validation algorithms, digital signature generation and validation algorithms, hashing algorithms for generating reference values, rules regarding generation of new blocks and block headers, a pool of pending transactions, transaction grouping rules, processing power data, power consumption data, blockchain node propensity values, propensity threshold values, etc.

The blockchain node 102 may also include blockchain data 206, which may be stored in the memory 208 of the blockchain node 102 or stored in a separate area within the blockchain node 102 or accessible thereby. The blockchain data 206 may include a blockchain, which may be comprised of a plurality of blocks and be associated with the blockchain network 104. In some cases, the blockchain data 206 may further include any other data associated with the blockchain and management and performance thereof, such as block generation algorithms, digital signature generation and confirmation algorithms, communication data for blockchain nodes 102, group identification rules, group identification algorithms, blockchain group data, transaction grouping rules, etc.

The blockchain node 102 may include a querying module 214. The querying module 214 may be configured to execute queries on databases to identify information. The querying module 214 may receive one or more data values or query strings, and may execute a query string based thereon on an indicated database, such as the memory 208 of the blockchain node 102 to identify information stored therein. The querying module 214 may then output the identified information to an appropriate engine or module of the blockchain node 102 as necessary. The querying module 214 may, for example, execute a query on the blockchain data 206 to identify a prior block in the blockchain or pending transactions for use in generating a new block.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate new blockchain data values, new block headers, Merkle roots, new blocks, and other data for operation of the blockchain. The generation module 216 may also be configured to identify blockchain groups 106 using a self-executing smart contract in the blockchain or an executable script in the configuration of the blockchain itself and to identify groups of pending blockchain transactions using suitable methods as discussed herein.

The blockchain node 102 may also include a validation module 218. The validation module 218 may be configured to perform validations for the blockchain node 102 as part of the functions discussed herein. The validation module 218 may receive instructions as input, which may also include data to be used in performing a validation, may perform a validation as requested, and may output a result of the validation to another module or engine of the blockchain node 102. The validation module 218 may, for example, be configured to confirm blockchain transactions by analyzing blockchain data values in the blockchain to ensure that the sender device is authorized to use the transaction outputs included in a new transaction submission and that the transaction outputs have not been previously used to transfer currency in another transaction. The validation module 218 may also be configured to validate digital signatures using public keys and suitable signature generation algorithms. The validation module 218 may be further configured to confirm new blocks, such as by validating block reference values and data reference values included therein.

The blockchain node 102 may also include a transmitting device 220. The transmitting device 220 may be configured to transmit data over one or more networks via one or more network protocols. In some instances, the transmitting device 220 may be configured to transmit data to other blockchain nodes 102 and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to blockchain nodes 102 that are superimposed or otherwise encoded with new blockchain data values, new blocks for confirmation, confirmed blocks, messages regarding block or transaction confirmations, and other data used in the operation and management of the blockchain.

Blockchain Consensus Process for Blockchain Groups

Figure 3:
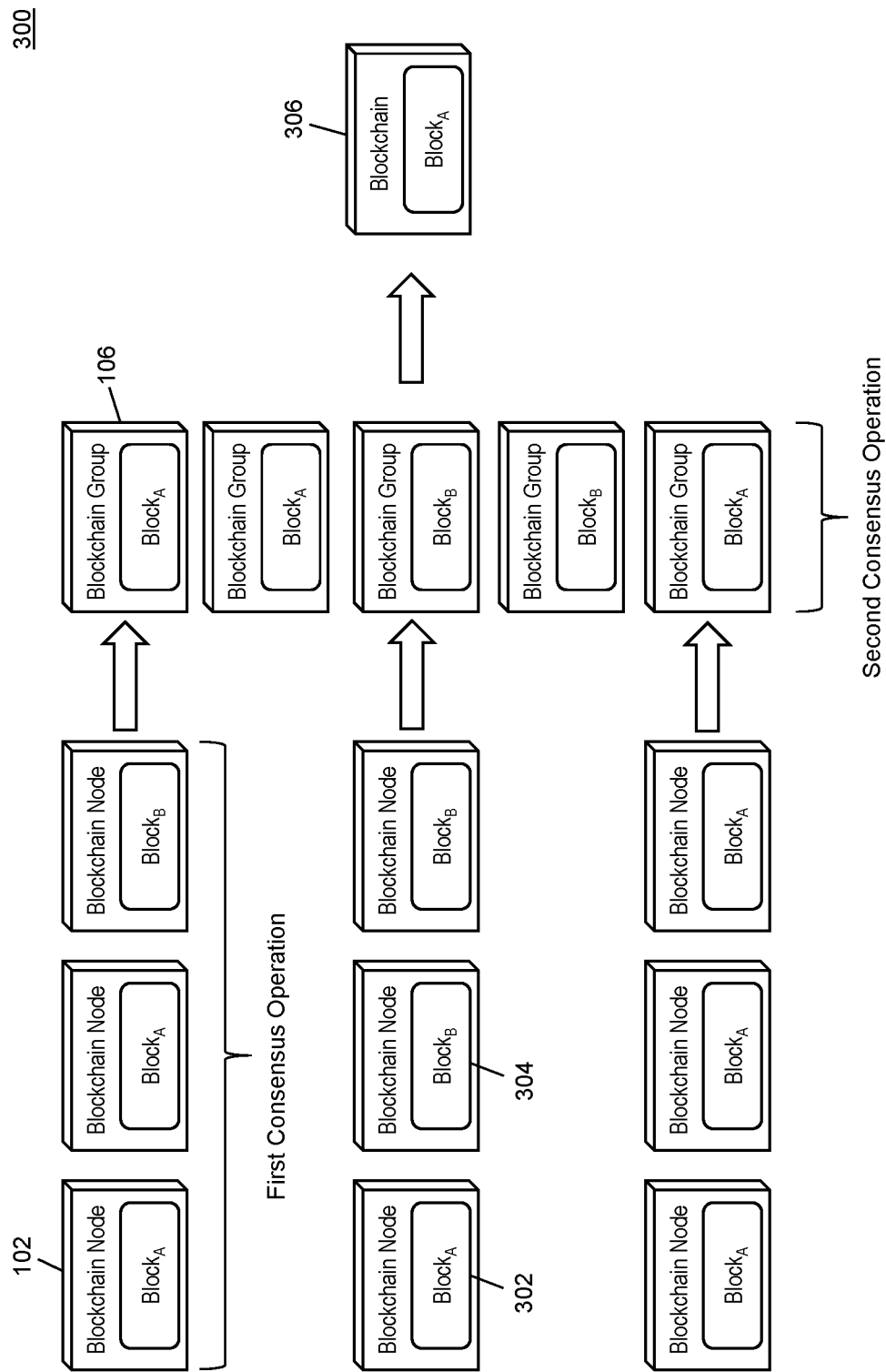
FIG. 3 is a diagram illustrating the consensus process in the system of FIG. 1 including multiple consensus operations with blockchain groups in accordance with exemplary embodiments.

FIG. 3 illustrates a consensus process 300 performed in the blockchain network 104 in the system 100 of FIG. 1, where multiple consensus operations are performed as a result of grouping blockchain nodes 102 into blockchain groups 106.

As illustrated in FIG. 3, the consensus process 300 may be performed through two consensus operations. The first consensus operation may be performed within a blockchain group 106. In the illustrated example, the blockchain groups 106 may be comprised of three blockchain nodes 102. Each blockchain node 102 in the blockchain group 106 may generate or otherwise confirm a new block. In the illustrated example, some blockchain nodes 102 may generate or confirm a first new block 302, $Block_A$, while others may generate or confirm a second new block 304, $Block_B$. In the example in FIG. 3, a first blockchain group 106 may have two of the three blockchain nodes 102 confirm the first new block 302; a second blockchain group 106 may have two of the three blockchain nodes 102 confirm the second new block 304; and a third blockchain group 106 may have all three blockchain nodes 102 confirm the first new block 302.

According to some aspects, any or all of the blockchain groups 106 may be formed based on clustering of nodes 102 based on the past confirmation history of blockchain nodes 102, such as described above. According to some aspects, the blockchain groups 106 may be formed with a certain percentage or number of nodes 102 being common to all of the blockchain groups 106. In this manner, the common nodes 102 may form a super consensus on a block ($Block_A$), and then push that block onto their respective blockchain groups 106. According to some aspects, the blockchain groups 106 may be formed with a leader node 102 and one or more follower nodes 102. In this manner, the follower nodes 102 may adopt the solution or new block ($Block_A$) of the leader node 102. According to some aspects, any of these methods may result in a unanimous consensus from all nodes 102 (e.g., in a second consensus operation). Blocks formed and confirmed in this manner may be labeled unanimous blocks.

After the first consensus operation, a second consensus operation may be performed by the blockchain groups 106 as part of the consensus process 300. In the second consensus operation, the blockchain groups 106 may distribute and confirm the new block for which consensus was met in the first consensus operation. In the illustrated example, there may be five blockchain groups 106 that participate in the second consensus operation, where three of the five blockchain groups 106 confirm the first new block 302, and the other two blockchain groups 106 confirm the second new block 304. Because more blockchain groups 106 confirmed the first new block 302, the result is that the blockchain 306 may add the first new block 302 as its new block in the main blockchain. The two blockchain groups 106 that confirmed the second new block 304 may proceed on a fork of the main blockchain where the second new block 304 was added to the blockchain.

Parallel Generation of New Blocks Using Blockchain Groups

Figure 4:
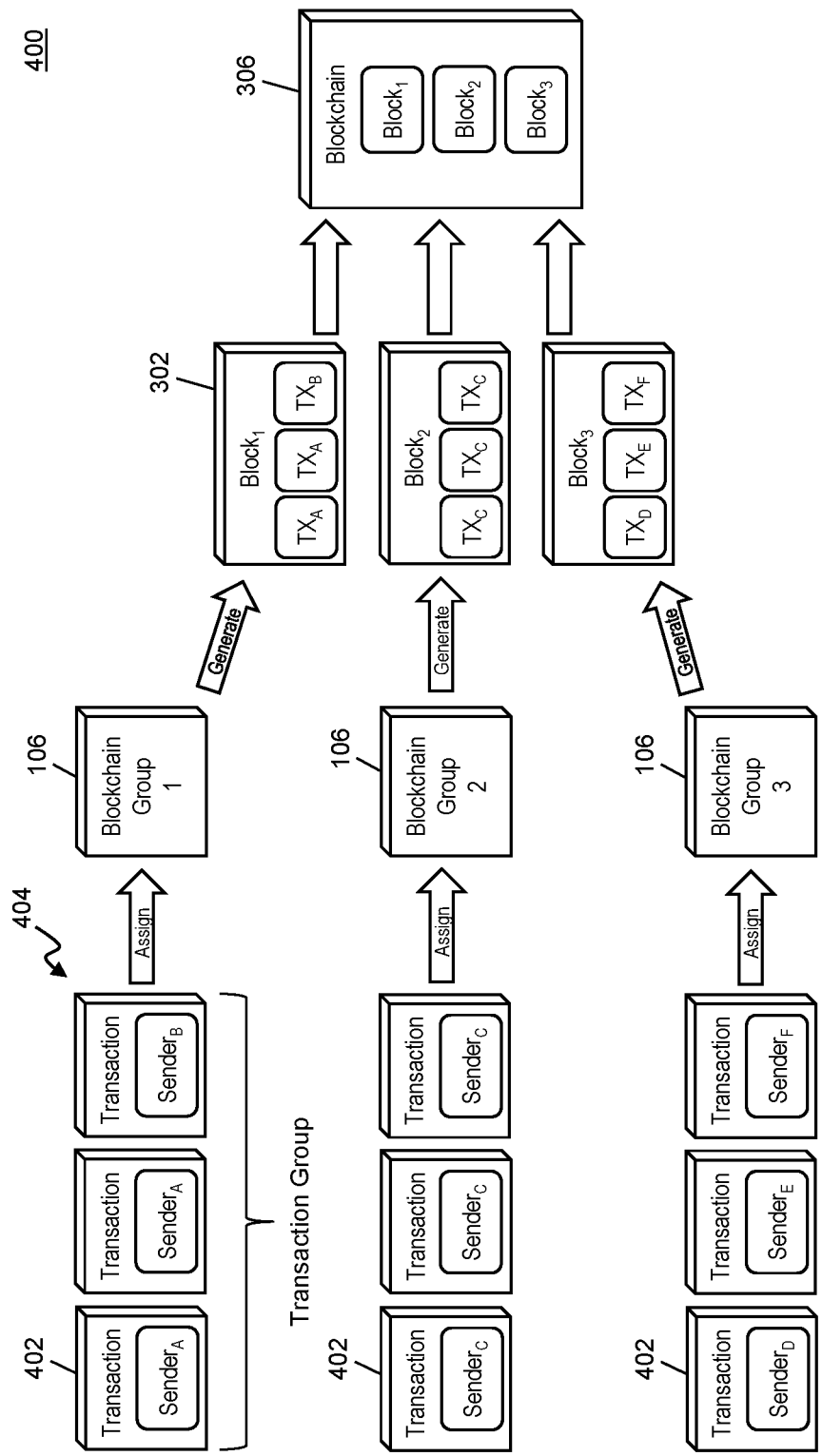
FIG. 4 is a diagram illustrating the parallel processing of new blocks in a blockchain in the system of FIG. 1 in accordance with exemplary embodiments.

FIG. 4 illustrates a process 400 for the parallel generation and confirmation of new blocks in the blockchain of the system 100 using the blockchain groups 106 and the separation of pending blockchain transactions into transaction groups.

As illustrated in FIG. 4, a plurality of pending blockchain transactions 402 may be received by the blockchain nodes 102 in the blockchain network 104. The blockchain network 104 may (e.g., via one or more blockchain nodes 102, a smart contract, etc.) separate the pending blockchain transactions 402 into a plurality of transaction groups 404. In some embodiments, such as illustrated in FIG. 4, each transaction group 404 may include the same number of pending blockchain transactions 402. In some cases, the pending blockchain transactions 402 may be separated such that every pending blockchain transaction 402 that includes a common sender (e.g., blockchain wallet from which associated cryptographic currency is being transferred) may be included in the same transaction group 404.

Each transaction group 404 may be assigned to a blockchain group 106 such that every blockchain group 106 in the blockchain network 104 receives a transaction group 404 of pending blockchain transactions 402 awaiting confirmation and addition to the blockchain. Each blockchain group 106 may generate a new block 302 that includes each of the pending blockchain transactions 402 assigned to the transaction group 106 that is successfully confirmed. In some cases, a blockchain group 106 may be comprised of multiple subgroups and may generate the new block using the process 300 illustrated in FIG. 3 and discussed above.

The new blocks 302 generated by each of the blockchain groups 106 may include the pending and now confirmed blockchain transactions assigned to the blockchain group 106 and may then be distributed to other blockchain groups 106 for confirmation using traditional processes. Once each of the new blocks 302 is confirmed, they may be added to the blockchain 306 in parallel such that all the new blocks 302 and, consequently, all the confirmed blockchain transactions 402, are added to the blockchain 306 at the same time.

Exemplary Method for Improving Consensus in a Blockchain

FIG. 5 illustrates a method 500 for improving consensus in a blockchain network through decentralized grouping and the performing of two consensus operations as part of a single consensus operation for a new block being added to a blockchain.

In step 502, a plurality of groups (e.g., blockchain groups 106) may be identified by each node (e.g., blockchain node 102) of a plurality of nodes in a blockchain network (e.g., blockchain network 104) that manages a blockchain, where each group in the plurality of groups is comprised of a subset of nodes of the plurality of nodes. In step 504, a new block for the blockchain may be generated by each node in the subset of nodes comprising each group of the plurality of groups, where the new block includes at least a block header and a plurality of blockchain data values.

In step 506, a first consensus operation may be performed by the subset of nodes comprising each group of the plurality of groups among all nodes in the subset of nodes for the new block generated by each node in the subset of nodes to identify a group consensus block, where each node in the subset of nodes for each group of the plurality of groups receives the group consensus block. In step 508, a second consensus operation may be performed by the blockchain network among all groups in the plurality of groups for the group consensus block identified in the first consensus operation for each group of the plurality of groups to identify an overall consensus block, where a majority of groups of the plurality of groups receives the overall consensus block.

In one embodiment, the group consensus block for each group of the majority of groups may be computationally equivalent. In some embodiments, a majority of nodes in each subset of nodes may generate a new block that is computationally equivalent. In one embodiment, a number of nodes in the subset of nodes in each group of the plurality of nodes may be equal. In some embodiments, the method 400 may further include distributing, by the blockchain network, the overall consensus block to each node in the subset of nodes in each group of the plurality of groups not in the majority of groups.

In one embodiment, each group in the plurality of groups not in the majority of groups may identify an alternative consensus block in the second consensus operation. In some embodiments, a total number of nodes in the subset of nodes in each group of the majority of groups may be greater than 50 percent of the plurality of nodes in the blockchain network. In one embodiment, identifying a plurality of groups may include executing a script stored in a memory of the node.

In some embodiments, the plurality of groups may be identified by clustering the plurality of nodes into a plurality of clusters based on a past confirmation history of each of the plurality of blockchain nodes, and by selecting, for each of the plurality of groups, one or more nodes from each of the plurality of clusters. In some embodiments, each of a plurality of common nodes of the plurality of nodes may be included in each of the plurality of groups; a third consensus operation may be performed, such as before the first consensus operation and the second consensus operation, to identify the group consensus block; and the second consensus operation may include each of the plurality of groups receiving the group consensus block.

In one embodiment, the method 500 may further include storing, in a memory (e.g., memory 208), a propensity value for each node of the plurality of nodes, wherein the propensity value may correspond to a propensity for the respective node to diverge from other nodes of the plurality of nodes, and the plurality of groups may be generated to minimize a number of nodes of the plurality of nodes that have a propensity value above a predetermined threshold value. In a further embodiment, the method 500 may even further include updating, in the memory, the propensity value for each node of the plurality of nodes based on a proposed block generated by the respective node during the first consensus operation.

In some embodiments, a total power consumption value for each group of the plurality of groups may be equal. In a further embodiment, a number of nodes in at least two groups of the plurality of groups may not be equal. In one embodiment, a total processing power for each group of the plurality of groups may be equal. In a further embodiment, a number of nodes in at least two groups of the plurality of groups may not be equal. In some embodiments, identifying the plurality of groups may include using a clustering algorithm to identify each group of the plurality of groups.

Exemplary Method for Parallel Generation and Confirmation of New Blocks

Figure 6:
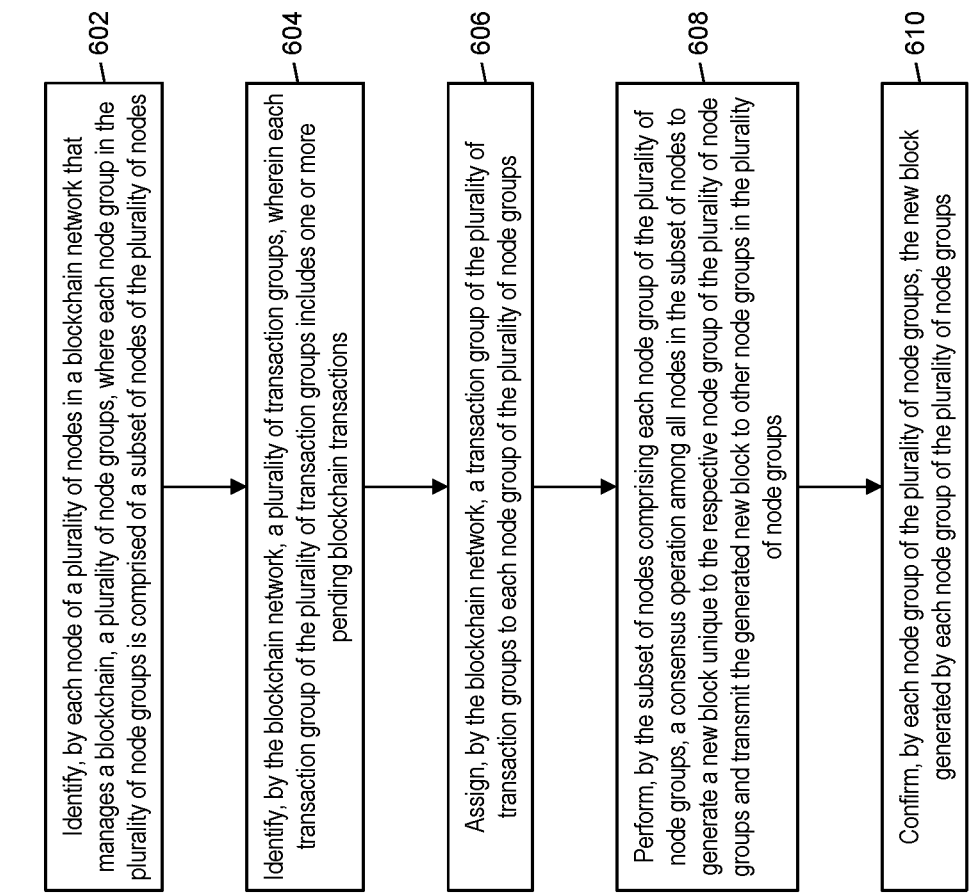
FIG. 6 is a flow chart illustrating an exemplary method for parallel generation and confirmation of new blocks in a blockchain through decentralized grouping in accordance with exemplary embodiments.

FIG. 6 illustrates a method 600 for the parallel generation and confirmation of new blocks in a blockchain through decentralized grouping.

In step 602, a plurality of node groups (e.g., blockchain groups 106) may be identified by each node (e.g., blockchain node 102) of a plurality of nodes in a blockchain network (e.g., blockchain network 104) that manages a blockchain, where each node in the plurality of node groups is comprised of a subset of nodes of the plurality of nodes. In step 604, a plurality of transaction groups (e.g., transaction groups 404) may be identified by the blockchain network, wherein each transaction group of the plurality of transaction groups includes one or more pending blockchain transactions (e.g., pending blockchain transactions 402).

In step 606, a transaction group of the plurality of transaction groups may be assigned to each node group of the plurality of node groups by the blockchain network. In step 608, a consensus operation may be performed among all nodes in the subset of nodes by the subsequent of nodes comprising each node group of the plurality of node groups to generate a new block unique to the respective node group of the plurality of node groups and transmit the generated new block to the other node groups in the plurality of node groups. In step 610, the new block generated by each node group of the plurality of node groups may be confirmed by each node group of the plurality of node groups.

In one embodiment, no pending blockchain transaction may be included in more than one transaction group of the plurality of transaction groups. In some embodiments, each transaction group of the plurality of transaction groups may include an equal number of pending blockchain transactions. In one embodiment, the blockchain may include the new block generated by each group of the plurality of groups after the confirming step. In some embodiments, a number of the plurality of transaction groups may be equal to a number of the plurality of node groups. In one embodiment, identifying the plurality of transaction groups may include grouping one or more sets of pending blockchain transactions that include a common source value, and each pending blockchain transaction in a set of pending blockchain transactions may be included in the same transaction group of the plurality of transaction groups.

Computer System Architecture

Figure 7:
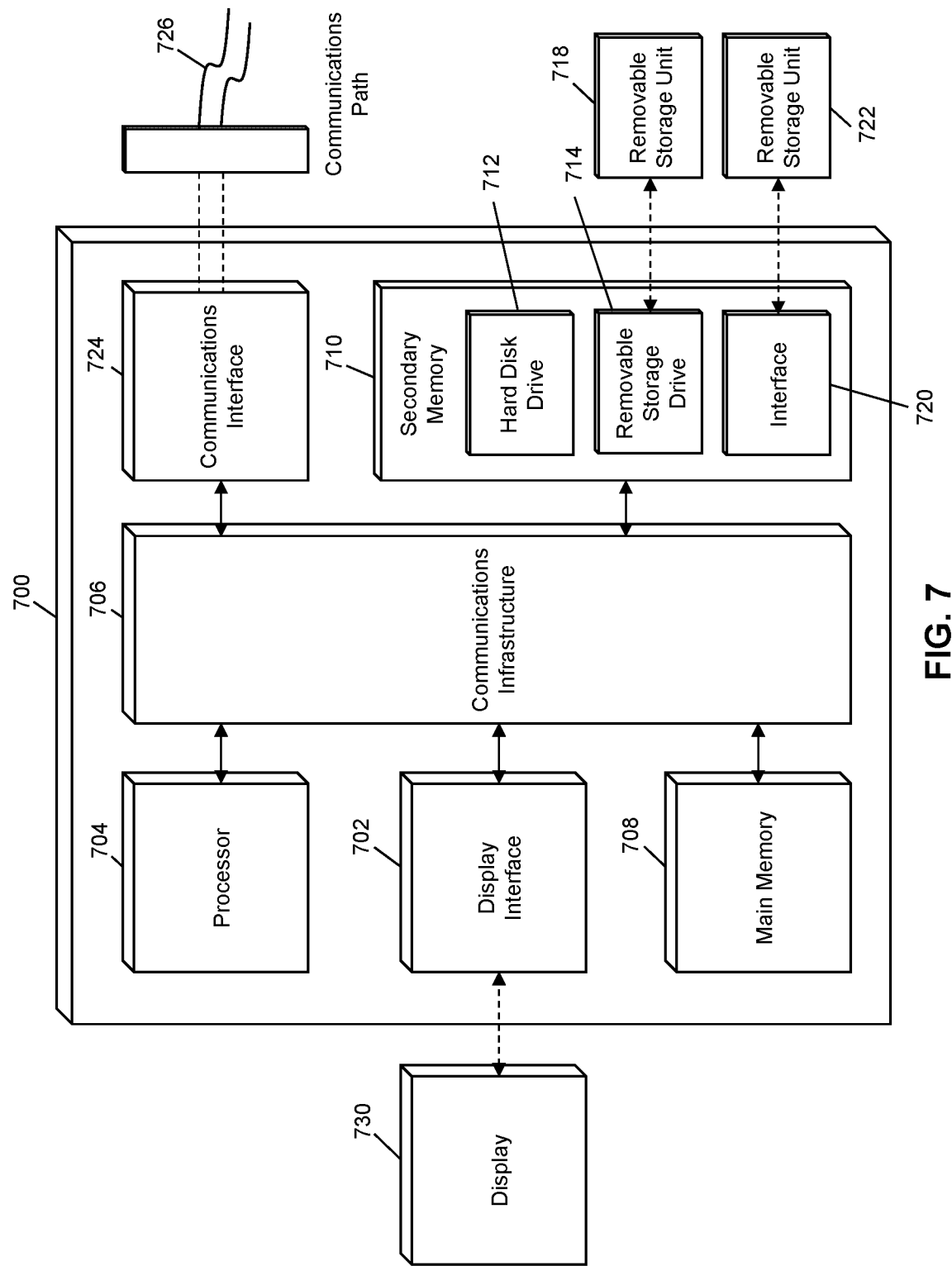
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the blockchain nodes 102 of FIGS. 1 and 2 may be implemented in the computer system 700 using hardware, non-transitory computer readable media having instructions stored thereon, or a combination thereof and may be implemented in one or more computer systems or other processing systems. Hardware may embody modules and components used to implement the processes of FIGS. 3 and 4 and the methods of FIGS. 5 and 6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the processes of FIGS. 3 and 4 and the methods illustrated by FIGS. 5 and 6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for improving consensus in a blockchain network through decentralized grouping and parallel generation and confirmation of new blocks in a blockchain through decentralized grouping. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for improving consensus in a blockchain network through decentralized grouping, comprising:
   identifying, by each node of a plurality of nodes in a blockchain network that manages a blockchain, a plurality of groups, where each group in the plurality of groups is comprised of a subset of nodes of the plurality of nodes;
   generating, by each node in the subset of nodes comprising each group of the plurality of groups, a new block for the blockchain, where the new block includes at least a block header and a plurality of blockchain data values;
   performing, by the subset of nodes comprising each group of the plurality of groups, a first consensus operation among all nodes in the subset of nodes for the new block generated by each node in the subset of nodes to identify a group consensus block, where each node in the subset of nodes for each group of the plurality of groups receives the group consensus block; and
   performing, by the blockchain network, a second consensus operation among all groups in the plurality of groups for the group consensus block identified in the first consensus operation for each group of the plurality of groups to identify an overall consensus block, where a majority of groups of the plurality of groups receives the overall consensus block.

2. The method of claim 1, further comprising:
   storing, in a memory, a propensity value for each node of the plurality of nodes, wherein
   the propensity value corresponds to a propensity for the respective node to diverge from other nodes of the plurality of nodes, and
   the plurality of groups are generated to minimize a number of nodes of the plurality of nodes that have a propensity value above a predetermined threshold value.

3. The method of claim 2, further comprising:
   updating, in the memory, the propensity value for each node of the plurality of nodes based on a proposed block generated by the respective node during the first consensus operation.

4. The method of claim 1, wherein a total power consumption value for each group of the plurality of groups is equal.

5. The method of claim 4, wherein a number of nodes in at least two groups of the plurality of groups is not equal.

6. The method of claim 1, wherein a processing power for each group of the plurality of groups is equal.

7. The method of claim 6, wherein a number of nodes in at least two groups of the plurality of groups is not equal.

8. The method of claim 1, wherein identifying the plurality of groups includes using a clustering algorithm to identify each group of the plurality of groups.

9. A hardware system for improving consensus in a blockchain network through decentralized grouping, comprising:
   a blockchain network that manages a blockchain; and
   a plurality of nodes in the blockchain network, wherein
   each node of the plurality of nodes includes a processing device and a memory and identifies a plurality of groups, where each group in the plurality of groups is comprised of a subset of nodes of the plurality of nodes,
   each node in the subset of nodes comprising each group of the plurality of groups generates a new block for the blockchain, where the new block includes at least a block header and a plurality of blockchain data values,
   the subset of nodes comprising each group of the plurality of groups performs a first consensus operation among all nodes in the subset of nodes for the new block generated by each node in the subset of nodes to identify a group consensus block, where each node in the subset of nodes for each group of the plurality of groups receives the group consensus block, and
   the blockchain network performs a second consensus operation among all groups in the plurality of groups for the group consensus block identified in the first consensus operation for each group of the plurality of groups to identify an overall consensus block, where a majority of groups of the plurality of groups receives the overall consensus block.

10. The hardware system of claim 9, wherein
    the memory stores a propensity value for each node of the plurality of nodes,
    the propensity value corresponds to a propensity for the respective node to diverge from other nodes of the plurality of nodes, and
    the plurality of groups are generated to minimize a number of nodes of the plurality of nodes that have a propensity value above a predetermined threshold value.

11. The hardware system of claim 10, wherein the memory updates the propensity value for each node of the plurality of nodes based on a proposed block generated by the respective node during the first consensus operation.

12. The hardware system of claim 9, wherein a total power consumption value for each group of the plurality of groups is equal.

13. The hardware system of claim 12, wherein a number of nodes in at least two groups of the plurality of groups is not equal.

14. The hardware system of claim 9, wherein a processing power for each group of the plurality of groups is equal.

15. The hardware system of claim 14, wherein a number of nodes in at least two groups of the plurality of groups is not equal.

16. The hardware system of claim 9, wherein identifying the plurality of groups includes using a clustering algorithm to identify each group of the plurality of groups.

17. A method for parallel generation and confirmation of new blocks in a blockchain through decentralized grouping, comprising:
- identifying, by each node of a plurality of nodes in a blockchain network that manages a blockchain, a plurality of node groups, where each node group in the plurality of node groups is comprised of a subset of nodes of the plurality of nodes;
- identifying, by the blockchain network, a plurality of transaction groups, wherein each transaction group of the plurality of transaction groups includes one or more pending blockchain transactions;
- assigning, by the blockchain network, a transaction group of the plurality of transaction groups to each node group of the plurality of node groups;
- performing, by the subset of nodes comprising each node group of the plurality of node groups, a consensus operation among all nodes in the subset of nodes to generate a new block unique to the respective node group of the plurality of node groups and transmit the generated new block to other node groups in the plurality of node groups; and
- confirming, by each node group of the plurality of node groups, the new block generated by each node group of the plurality of node groups.

18. The method of claim 17, wherein no pending blockchain transaction is included in more than one transaction group of the plurality of transaction groups.

19. The method of claim 17, wherein each transaction group of the plurality of transaction groups includes an equal number of pending blockchain transactions.

20. The method of claim 17, wherein the blockchain includes the new block generated by each group of the plurality of groups after the confirming step.

21. The method of claim 17, wherein a number of the plurality of transaction groups is equal to a number of the plurality of node groups.

22. The method of claim 17, wherein
- identifying the plurality of transaction groups includes grouping one or more sets of pending blockchain transactions that include a common source value, and
- each pending blockchain transaction in a set of pending blockchain transactions is included in the same transaction group of the plurality of transaction groups.

23. A hardware system for parallel generation and confirmation of new blocks in a blockchain through decentralized grouping, comprising:
- a blockchain network that manages a blockchain; and
- a plurality of nodes in the blockchain network, wherein each node of the plurality of nodes includes a processing device and a memory and identifies a plurality of node groups, where each node group in the plurality of node groups is comprised of a subset of nodes of the plurality of nodes;
- the blockchain network identifies a plurality of transaction groups, wherein each transaction group of the plurality of transaction groups includes one or more pending blockchain transactions;
- the blockchain network assigns a transaction group of the plurality of transaction groups to each node group of the plurality of node groups;
- the subset of nodes comprising each node group of the plurality of node groups performs a consensus operation among all nodes in the subset of nodes to generate a new block unique to the respective node group of the plurality of node groups and transmit the generated new block to other node groups in the plurality of node groups; and
- each node group of the plurality of node groups confirms the new block generated by each node group of the plurality of node groups.

24. The hardware system of claim 23, wherein no pending blockchain transaction is included in more than one transaction group of the plurality of transaction groups.

25. The hardware system of claim 23, wherein each transaction group of the plurality of transaction groups includes an equal number of pending blockchain transactions.

26. The hardware system of claim 23, wherein the blockchain includes the new block generated by each group of the plurality of groups after the confirming step.

27. The hardware system of claim 23, wherein a number of the plurality of transaction groups is equal to a number of the plurality of node groups.

28. The hardware system of claim 23, wherein
- identifying the plurality of transaction groups includes grouping one or more sets of pending blockchain transactions that include a common source value, and
- each pending blockchain transaction in a set of pending blockchain transactions is included in the same transaction group of the plurality of transaction groups.

* * * * *